(No Model.) 2 Sheets—Sheet 2.
M. FORDER.
HAND BALING PRESS.

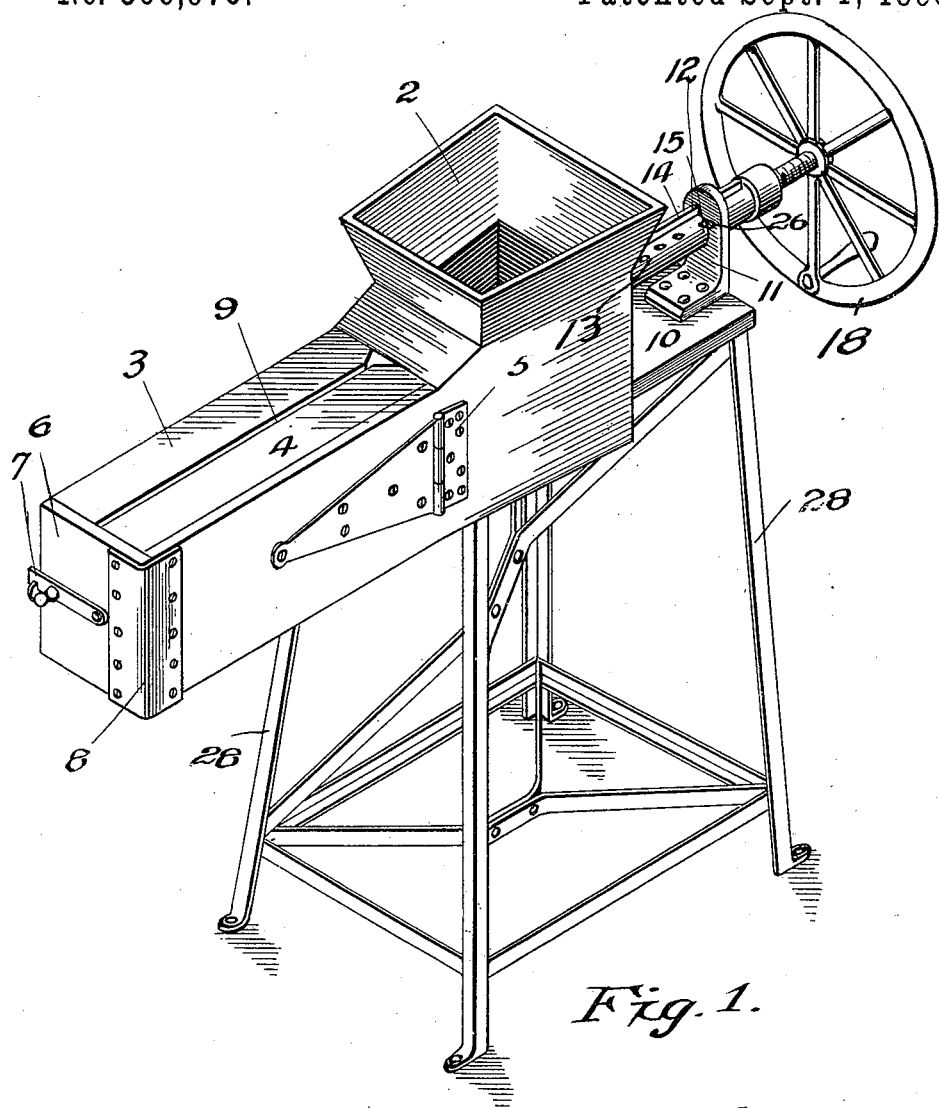
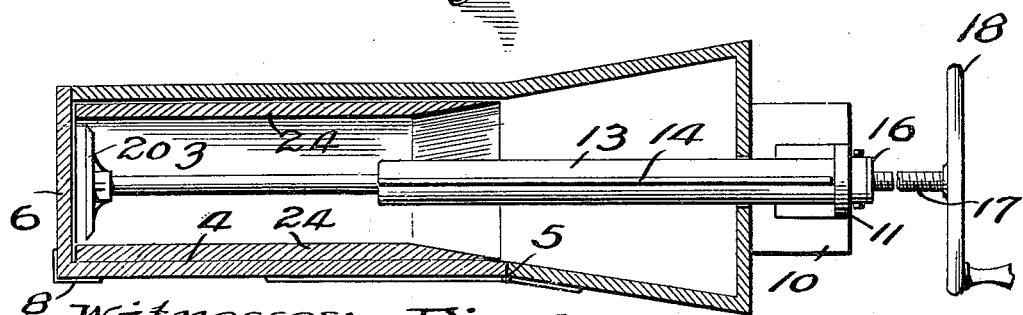

No. 566,976. Patented Sept. 1, 1896.

Witnesses:
C. E. Van Doren
Richard Paul

Inventor:
Milton Forder
By Paul O. Hawley
his Att'ys

UNITED STATES PATENT OFFICE.

MILTON FORDER, OF LITCHFIELD, MINNESOTA.

HAND BALING-PRESS.

SPECIFICATION forming part of Letters Patent No. 566,976, dated September 1, 1896.

Application filed August 3, 1895. Serial No. 558,090. (No model.)

*To all whom it may concern:*

Be it known that I, MILTON FORDER, of Litchfield, Meeker county, Minnesota, have invented certain new and useful Improvements in Hand Baling-Machines, of which the following is a specification.

My invention relates to a hand-operated device for baling flax and other straw for fuel and other purposes.

The object of my invention is to provide a simple, compact machine which may be operated by one person and by which small solid bales of flax, straw, or other like material may be made in suitable sizes for burning in furnaces, heating-stoves, and cook-stoves.

My invention consists generally in the combination, with a press-box arranged so that the bale may be removed therefrom, of a plunger to operate within the box and a stem adapted to both a reciprocatory and a screw movement, whereby the initial pressure of the material may be rapid and the final pressure slowly and strongly applied.

My invention consists, further, in particular constructions and combinations, all as hereinafter described, and particularly pointed out in the claims.

The invention will be more readily understood by reference to the accompanying drawings, forming part of this specification, and in which—

Figure 2:
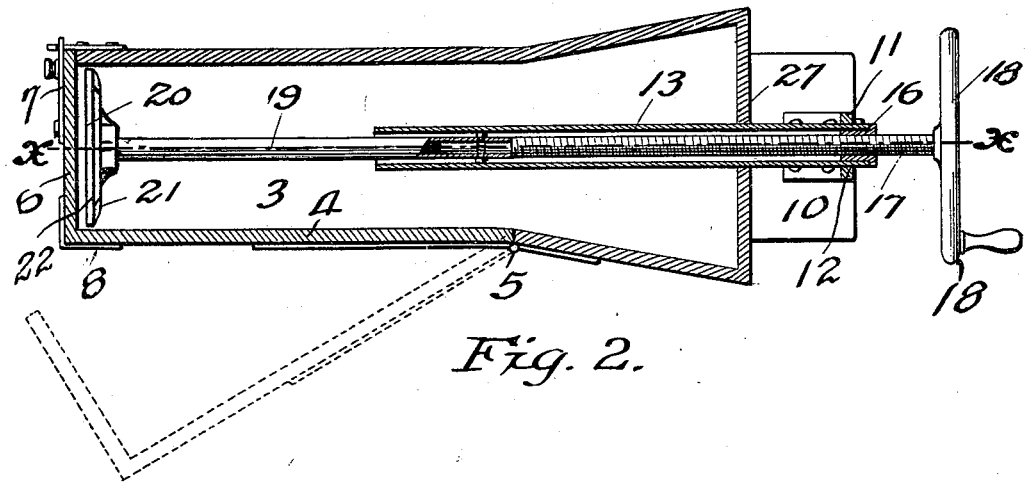
Figure 3:
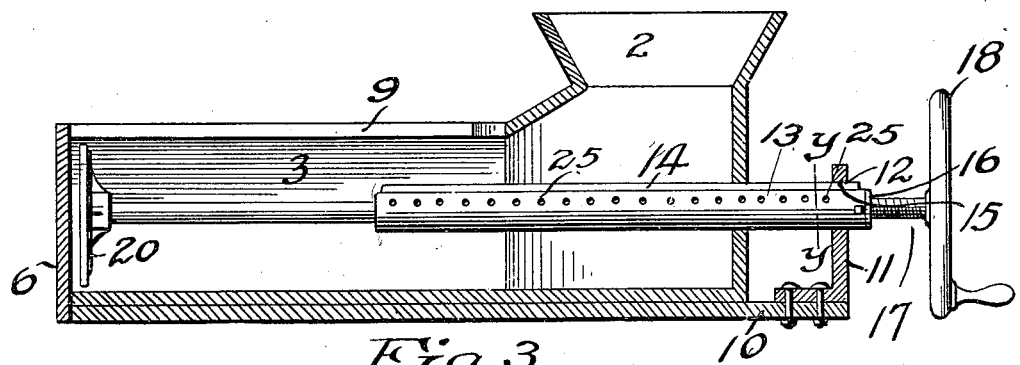
Figures 5, 6:
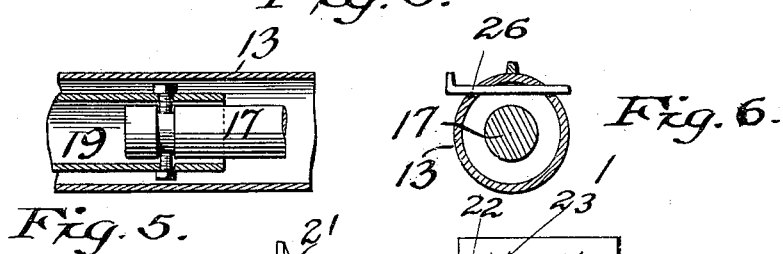
Figures 7, 8:
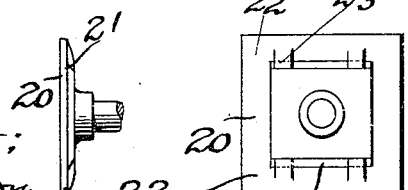

Figure 1 is a perspective view of a hand baling-machine embodying my invention. Fig. 2 is a horizontal section thereof substantially on the line of the plunger-shaft. Fig. 3 is a vertical section of the body of the machine on the line $xx$ of Fig. 2. Fig. 4 is a horizontal section similar to Fig. 2 and showing the means for reducing the size of the press. Fig. 5 is an enlarged detail of the coupling between the screw-shaft and the plunger-rod. Fig. 6 is an enlarged cross-section of the shaft on the line $yy$ of Fig. 3. Figs. 7 and 8 are side and rear views of the enlarged plunger or head.

As shown in the drawings, my device is made up of a hopper portion 2, into which the straw is thrust and forced down by the plunger. The press-box 3 leads from the hopper portion, which hopper portion is preferably tapered and reduced to the size of the press-box. The box itself is made up of a part stationary with respect to the hopper and of a second part 4, secured by a hinge 5 to the hopper portion and having the end 6 adapted to lap by the end of the stationary part of the box and to be secured by a catch 7. The side of the part 4 and the end may be strengthened by a metal angle-piece 8, if desired. The two parts of the box do not meet at the top, but instead a slot 9 is left, through which the wire for securing the bale may be placed. At the opposite end of the hopper the bottom part is extended to form the shelf 10 to receive the iron bracket 11, having the opening 12, through which the plunger rod or shaft may operate. The plunger-rod is made in several parts, the first being the pipe or tube 13, extending through the hole 12 and provided with a feather 14 to operate in the loose keyway 15 in the bracket 11. In the end of the pipe or tube 13 is a threaded block or head 16 to receive the threaded screw-shaft 17, upon the outer end of which is a hand-wheel 18. This shaft is considerably smaller than the pipe, and its inner end is coupled to the plunger-rod proper, 19, by a joint, which permits the screw-shaft to turn while the rod 19 remains stationary. On the end of the rod 19 is the plunger-head 20, which is preferably of cast-iron and has flaring edges 21 to receive a larger head 22, provided with inwardly-inclined lugs 23, to engage the beveled edges 21 of the smaller head.

The plunger in the complete form shown in Figs. 7 and 8 is ordinarily used with my device, but if it is desired to make a smaller bale the reducing-boards 24 are placed within the box, and in this case the larger head must be removed and the smaller one alone used. The reducing-boards 24 are preferably beveled at their forward ends, as shown in Fig. 4. The pipe or tube 13 is preferably provided with a number of holes 25, into which a pin 26 may be inserted back of the block or bracket 11 to lock the tube against longitudinal movement. Other means may be employed for this purpose, if desired. The device may be supported upon a suitable framework-base 28, as shown in Fig. 1, the same being thereby raised to a convenient height for use.

The operation of my machine is as follows:

The screw-shaft is first run out to the limit of its movement and then by means of the hand-wheel 8 the whole plunger device is drawn back, carrying the plunger-head close to the front wall 27 of the hopper. The straw is then packed into the hopper, after which the operator grasps the hand-wheel and works the plunger back and forth several times, the pin 26 meantime having been removed, so that the tube works freely through the bracket 11. The operation of inserting the straw is repeated until the operator can no longer force the straw into the press-box. The operator then locks the tube by means of the pin and by turning the hand-wheel forces the plunger in with the screw 17. In this way the final pressure upon the bale within the box is very great. The wire for binding the bale is then tied between the end of the box and the plunger, after which the latch 7 is freed and the side 4 of the box opened out, as indicated in Fig. 2. The plunger is then run back and the bale withdrawn.

Having thus described my invention, I claim as new and desire to secure by Letters Patent—

1. A hand baling-machine, comprising a hopper portion and a press-box leading therefrom, said box having a part to be opened for the withdrawal of a bale, a plunger to operate within the box, a longitudinally-movable plunger-rod connected therewith, means for locking the same against movement, and a screw mechanism provided in connection with the plunger-rod to operate within the same, substantially as described.

2. The combination, with the hopper, of the press-box provided in connection therewith, a plunger to operate within said box, a plunger-rod, a bearing for the outer end thereof, said rod comprising a rod 19, a screw-shaft connected therewith, an outer shaft or tube wherein said screw-shaft is adapted to operate, and said outer shaft adapted to slide through said bearing and to be locked therein, substantially as described and for the purpose specified.

3. The combination, with the hopper, of the press-box having a hinged side and end, means for locking said side and end, a tube to operate within said box, a plunger in connection with said tube, means for the rapid reciprocation of said tube, and a longitudinally-operating screw mechanism arranged within said tube for the slow final movement of the same, substantially as described.

4. The combination, with the hopper, of the press-box, said box having a side adapted to be opened, a plunger, the plunger-rod comprising the rod 19, the threaded shaft 17 coupled thereto, the outer pipe or tube wherein said screw-shaft is adapted to operate, the crank or hand wheel upon said screw-shaft, the bearing through which said pipe or tube is adapted to operate freely, means to prevent the rotation of said pipe or tube, and means for locking the same in said bearing, substantially as described.

5. The combination, in a hand baling-machine, of a hopper, with a press-box leading therefrom, said box being in two parts adapted to be separated to permit the withdrawal of a bale therefrom, a plunger, a hollow longitudinally-movable plunger-rod combined therewith, and a screw mechanism provided within said rod whereby a strong final pressure may be obtained, substantially as described.

In testimony whereof I have hereunto set my hand this 22d day of July, A. D. 1895.

MILTON FORDER.

In presence of—
WM. H. MCCARTHY,
WM. GRANO.